US006536273B2

(12) United States Patent
Schrittenlacher

(10) Patent No.: US 6,536,273 B2
(45) Date of Patent: Mar. 25, 2003

(54) THERMAL FLOW-RATE SENSOR AND METHOD FOR DETERMINING THE FLOW RATE OF A FLUID

(75) Inventor: Wolfgang Schrittenlacher, Hamburg (DE)

(73) Assignee: Fafnir GmbH, Hamburg (DE)

( * ) Notice: Subject to any disclaimer, the term of this patent is extended or adjusted under 35 U.S.C. 154(b) by 0 days.

(21) Appl. No.: 09/776,691

(22) Filed: Feb. 6, 2001

(65) Prior Publication Data

US 2001/0032503 A1 Oct. 25, 2001

(51) Int. Cl.⁷ .................................................. G01F 1/68
(52) U.S. Cl. ................................................... 73/204.11
(58) Field of Search ........................ 73/204.11, 204.22, 73/204.23, 204.16, 204.19

(56) References Cited

U.S. PATENT DOCUMENTS

| 4,480,467 A | * 11/1984 | Harter et al. ............... 340/606 |
| 4,885,938 A | 12/1989 | Higashi |
| 5,339,687 A | * 8/1994 | Gimson et al. .......... 73/204.19 |
| 5,753,835 A | * 5/1998 | Gustin ......................... 374/208 |
| 5,780,737 A | * 7/1998 | Wible et al. ............. 73/204.11 |
| 5,880,354 A | * 3/1999 | Newman et al. ......... 73/204.25 |

FOREIGN PATENT DOCUMENTS

| WO | WO 90/09567 | 8/1990 |
| WO | WO 93/15381 | 8/1993 |

* cited by examiner

*Primary Examiner*—Hezron Williams
*Assistant Examiner*—Corey D. Mack
(74) *Attorney, Agent, or Firm*—Nixon & Vanderhye

(57) ABSTRACT

A thermal flow-rate sensor has a flow sensor (3) and a thermal-conductivity measuring cell (4). The flow sensor (3) comprises a first heating device and a first temperature detector, which reacts to the temperature of the first heating device, and can be exposed to a flowing fluid whose flow rate is to be determined. The thermal-conductivity measuring cell (4) comprises a measuring-cell casing (42), a second heating device and a second temperature detector which reacts to the temperature of the second heating device. The measuring-cell casing (42) has at least one opening (46) arranged for entry of the fluid into the measuring-cell casing (42).

21 Claims, 2 Drawing Sheets

Figure 1:
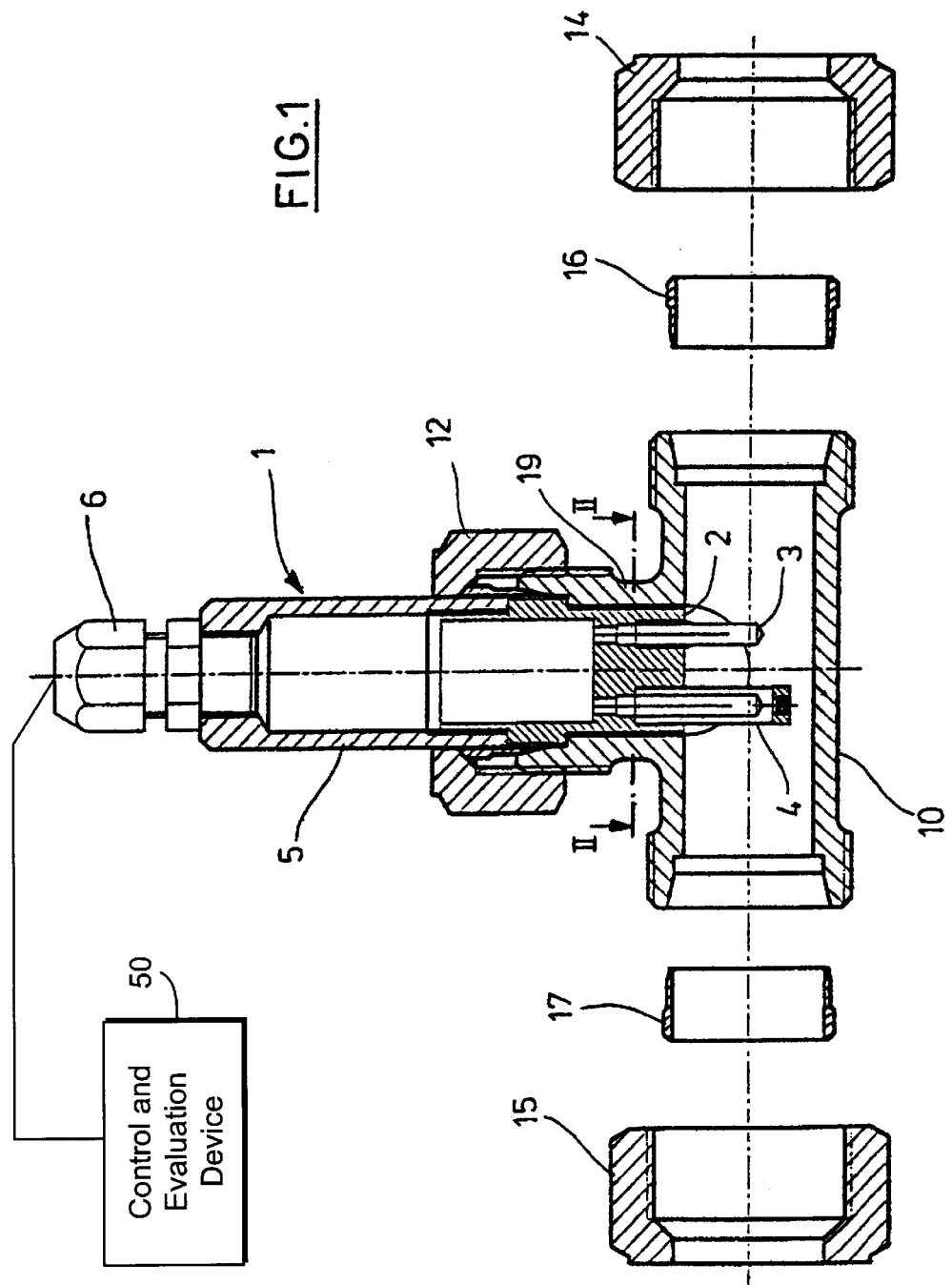

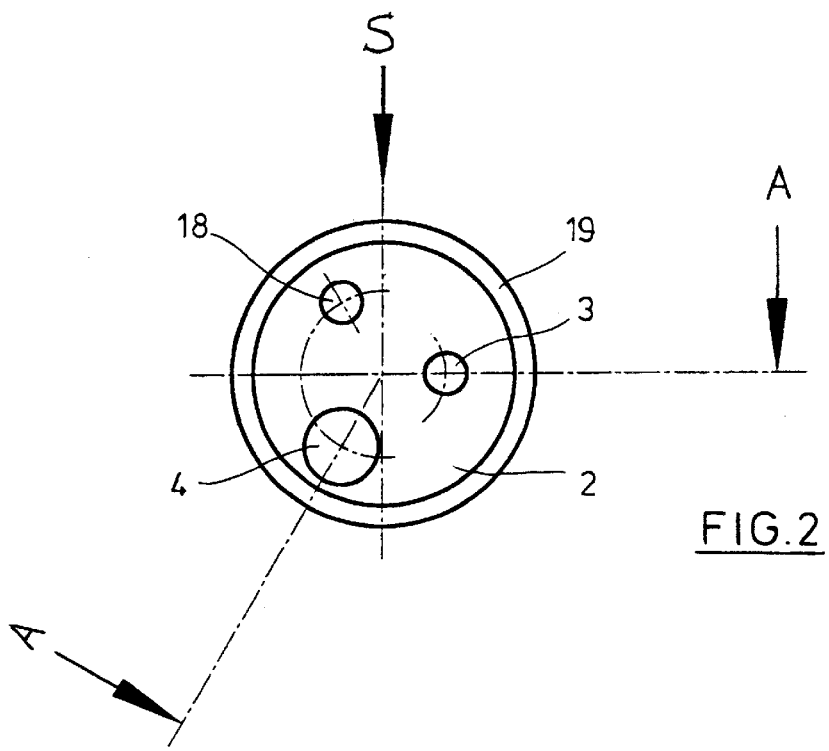
FIG. 2
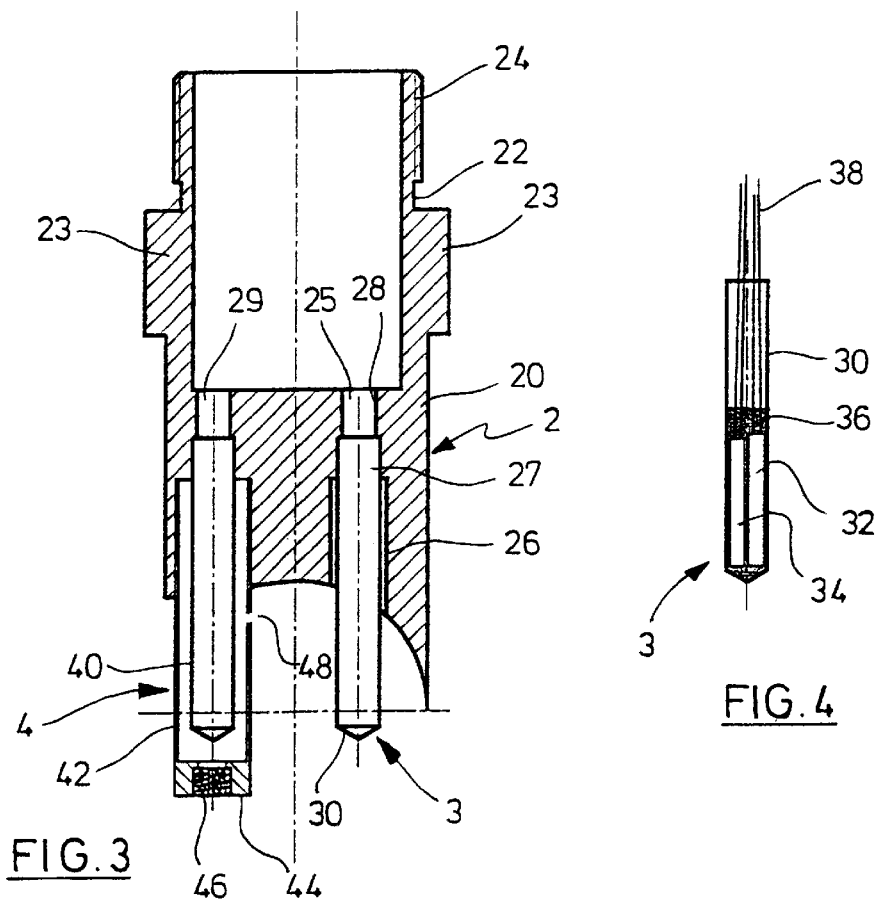
FIG. 3
FIG. 4

THERMAL FLOW-RATE SENSOR AND METHOD FOR DETERMINING THE FLOW RATE OF A FLUID

The invention relates to a thermal flow-rate sensor and a method for determining the flow rate of a fluid.

The practice of determining the flow rate of a fluid (i.e., a liquid or a gas) through, for example, a pipeline, by means of a thermal flow sensor is known in the art. Such a flow sensor comprises a heating device and a temperature detector which reacts to the temperature of the heating device. For the purpose of determining the flow rate, use is made of the cooling a effect on the flow sensor caused by the inflowing fluid. The greater the velocity of flow and, consequently, the flow rate of the fluid, the greater the quantity of heat that is taken away from the flow sensor by the fluid per unit of time through heat transfer and convection. Thus, for example, if a constant heating power is supplied to the heating device, the temperature detected by the temperature detector is lower in the case of a high flow rate than in the case of a low flow rate. Accordingly, if the heating power is regulated in such a way that the flow sensor is at a constant temperature, a higher heating power is required in the case of a greater flow rate than in the case of a lesser flow rate. Calibration is required in order to permit measurement of absolute flow quantities with such a flow sensor. This takes account, for example, of effects of the geometry of the flow sensor and the material properties of the fluid, which are substantial contributory factors in the determination of the heat dissipation capacity. Thus, for example, the heat dissipation capacity of the fluid depends on its composition.

Measurement of the flow rate by means of such thermal flow sensors is described in, for example, the textbooks of O. Fiedler, "Strömungs- und Durchflußmeßtechnik" ["Flow and flow-rate measuring systems"] (Oldenbourg-Verlag 1992), and H. Eckelmann, "Einführung in die Strömungsmeßtechnik" ["Introduction to flow measuring techniques"] (Teubner-Verlag 1997).

In order to render possible the use of a flow sensor of the type outlined, the composition of the fluid whose flow rate is to be determined must not vary, or it must vary only within very narrow limits. This is because a different fluid composition could result in an alteration of the heat dissipation capacity, so that changes in the temperature or in the heating power of the flow sensor are not necessarily attributable to flow rate variations.

The object of the invention is to provide a thermal flow-rate sensor and a method for determining the flow rate of a fluid with the use of a thermal flow-rate sensor which also render possible flow-rate measurement on a fluid of variable composition.

This object is achieved by a thermal flow-rate sensor having the features of claim 1 and by a method, having the features of claim 14, for determining the flow rate of a fluid. Advantageous embodiments are disclosed by the dependent claims.

The thermal flow-rate sensor according to the invention comprises a flow sensor with a first heating device and a first temperature detector, reacting to the temperature of the first heating device, and can be exposed to a flowing fluid whose flow rate is to be determined. This flow sensor is a thermal flow sensor, based on the principle described above. In addition, the thermal flow-rate sensor has a thermal-conductivity measuring cell which comprises a measuring-cell casing, a second heating device and a second temperature detector, reacting to the temperature of the second heating device, the measuring-cell casing having at least one opening arranged for entry of the fluid into the measuring-cell casing.

A portion of the fluid can enter the thermal-conductivity measuring cell via the opening. Within the thermal-conductivity measuring cell, virtually no thermal transfer occurs through convection, since this measuring cell is designed for measuring the thermal conductivity of a fluid contained in it and its interior is therefore largely protected against disturbance by fluid flows. The thermal conductivity of the fluid can be determined by means of the second heating device and the second temperature detector, which reacts to the temperature of the second heating device. The fundamental measuring principle of the thermal-conductivity measuring cell is similar to that of the thermal flow sensor, but since no convection occurs within the measuring-cell casing, the heat removed from the second heating device by the fluid is transferred essentially through thermal conduction. Through selection of an appropriate geometry (particularly a small spacing between the second heating device and the inside of the measuring-cell casing) and an appropriate temperature range for the second heating device (relatively low temperatures are advantageous), the proportion of radiation in the heat transfer can be kept low. Such thermal-conductivity measuring cells, and the measuring principle used with them, are known in the art. The thermal conductivity of the fluid can therefore be determined by means of the thermal-conductivity measuring cell.

The thermal conductivity is a measure of the composition of the fluid. If the fluid has two components with different thermal conductivities, the proportions of the components in the fluid can be determined through a measurement of the thermal conductivity of the fluid. However, the thermal flow-rate sensor according to the invention can also be used, advantageously, for fluids with more than two components, as illustrated by the following example. If, for example, the fluid is a mixture of air and the hydrocarbons propane and butane, in respect of its thermal conductivity it consists essentially of two components, namely air and hydrocarbon. This is because, in comparison with air, propane and butane differ only slightly from one another in respect of their thermal conductivity properties and also have a similar heat dissipation capacity in respect of the flow sensor. In the case of this fluid, for example, the concentration of hydrocarbon in air can be determined, in the range from 0% to 100%, with an accuracy of better than 5%, by means of the thermal-conductivity measuring cell. The composition of the fluid is thus known with sufficient accuracy to enable it to be taken into account in the behaviour of the flow sensor.

The thermal-conductivity measuring cell thus makes it possible, by simple means, for the composition of the fluid to be determined or at least estimated to the extent that composition-dependent differences in the heat dissipation capacity of the fluid can be taken into account in the operation of the flow sensor in order to achieve a reliable flow-rate measurement. Since the thermal flow-rate sensor according to the invention comprises both the flow sensor and the thermal-conductivity measuring cell, it is ensured that all measurements are always performed on the same fluid.

The thermal flow-rate sensor preferably comprises a control and evaluation device which is arranged for the purpose of generating a first measuring signal, characterizing the heat dissipation capacity of the fluid, by means of the heating power supplied to the second heating device and the temperature of the second temperature detector, and generating a second measuring signal, characterizing the flow rate of the fluid, by means of the heating power supplied to the first heating device, the temperature of the first temperature detector and the first measuring signal. This first measuring signal is preferably assigned to the composition of the fluid. The control and evaluation device renders possible a preferably fully automatic operation of the flow sensor and thermal-conductivity measuring cell under the conditions explained above. In a preferred embodiment, the control and evaluation device is arranged for the purpose of determining the flow rate of the fluid by means of parameters, determined in calibration measurements, and the second measuring signal. By means of such calibration measurements, as already mentioned above, the quantities entering into the evaluation of the measurement results can be determined using predefined fluids in predefined conditions, so that it is possible, in principle, to output the flow-rate value of a flowing fluid directly from the control and evaluation device, for example on to a display or into a memory.

In a preferred embodiment, the thermal flow-rate sensor comprises a third temperature detector which is arranged for the purpose of measuring the ambient temperature. The accuracy of the thermal flow-rate sensor increases with the accuracy with which the ambient temperature is known. Thus, for example, the difference between the temperature of the second heating device and the temperature of the measuring-cell casing, which corresponds largely to the ambient temperature, enters into the determination of the thermal conductivity.

The control and evaluation device is preferably arranged for the purpose of regulating the heating power of the first heating device so that the temperature of the first temperature detector exceeds the ambient temperature by a predefined value. The control and evaluation device can also be arranged for the purpose of regulating the heating power of the second heating device so that the temperature of the second temperature detector exceeds the ambient temperature by a predefined value. Thus, for example, the temperature of the first heating device and the second heating device can be kept at 50 K above the ambient temperature through controlling of the respective heating powers. The instantaneous heating power is then a direct measure of the amount of heat removed from the flow sensor by the fluid per unit of time, or rather, of the amount of heat transferred away through thermal conduction per unit of time in the thermal-conductivity measuring cell.

In a preferred embodiment, the measuring-cell casing comprises a porous sintered body which is permeable to the fluid. The sintered body thus forms many small openings through which the fluid, from a region in which it may be flowing at high velocity, can enter the interior of the measuring-cell casing where it must not flow, since otherwise the measurement of the thermal conductivity would be falsified by a convection component. The measuring-cell casing preferably comprises a further opening at a distance from the sintered body. The measuring-cell casing can be of a cylindrical basic shape, the sintered body being disposed at an end, the further opening on the circumferential surface of the basic cylindrical shape and the second heating device and the second temperature detector in the region around the longitudinal axis of the basic cylindrical shape. In the case of such an arrangement, the fluid flowing past the further opening, outside the measuring-cell casing, produces within the measuring-cell casing a negative pressure which draws fluid into the measuring-cell casing through the sintered body. This ensures that the fluid is continuously replaced from the measuring-cell casing without disturbing convection movements and therefore corresponds, in respect of its composition, to the fluid flowing past the flow sensor.

The first heating device and the first temperature detector are preferably disposed, in thermal contact, in a first capsule; the same can also apply to the second heating device and the second temperature detector. In the case of this design, the first or second temperature detector directly assumes the temperature of the respective heating device, increasing the measuring accuracy.

In the case of a preferred embodiment, the thermal-conductivity measuring cell is disposed in the flow shadow, for example, in the flow shadow of the flow sensor or in the flow shadow of the third temperature detector. Contamination of the sintered body by dirt particles carried along in the fluid flow can be largely prevented through such an arrangement.

The first heating device and/or the second heating device can comprise a heating resistor which has a positive temperature coefficient in the operating range. Such a PTC heating resistance serves as a reliable safeguard against overheating, which is important, for example, if the fluid is an explosive gas. If the temperature of the heating resistor were to increase due to a fault in the open-loop or closed-loop control of the heating power supplied to the respective heating resistor, the resultant higher resistance value, at an upper voltage limit defined by the power supply, would cause a decrease in the heating current, so that the temperature drops. The system is thus inherently stable without additional safety devices.

The flow sensor and the thermal-conductivity measuring cell are preferably mounted on a common support and can be brought into contact with the fluid via a T-piece provided on a pipeline for the flowing fluid. Such a design provides for a clear overview, is low-cost and enables maintenance work to be performed easily.

The invention is described in greater detail below with reference to an embodiment example and the drawings, wherein:

FIG. 1 shows a schematic longitudinal section through a thermal flow-rate sensor mounted in a T-piece which can be incorporated in a pipeline with flowing fluid, FIG. 2 shows a schematic cross section through the arrangement from FIG. 1, at the level of the line II—II from FIG. 1, FIG. 3 shows an enlarged longitudinal section through parts of the thermal flow-rate sensor according to FIG. 1, along the angled line A—A from FIG. 2, and FIG. 4 shows a longitudinal section which illustrates the internal structure of a capsule used in the thermal flow-rate sensor according to FIG. 1.

FIG. 1 depicts a thermal flow-rate sensor 1 incorporated in a pipeline. Flowing in the pipeline is a fluid (in the embodiment example, a mixture of air and propane and butane gas) whose flow rate is to be determined.

The thermal flow-rate sensor 1 has a support 2 of metal on which are mounted a flow sensor 3 and a thermal-conductivity measuring cell 4. Connected to the support 2 by a screwed connection is a tubular extension piece 5, at the upper end of which there is a screwed cable gland 6. The tubular extension piece 5 and the screwed cable gland 6 serve as means of fastening the electric feeder cables which lead to the flow sensor 3, the thermal-conductivity measuring cell 4 and a separate temperature sensor (see below). The other end of the electric feeder cables is connected to a separate control and evaluation device, which is a further component of the thermal flow-rate sensor 1 and identified in FIG. 1 at 50.

It can be seen from FIG. 1 that the thermal flow-rate sensor 1 sits in a T-piece 10, with the support 2 and the tubular extension piece 5 being retained by a screw fitting 12. Further screw fittings 14 and 15, which are depicted in exploded view in FIG. 1 with associated cutting rings 16 and 17, serve to join the T-piece 10 to a pipeline system. By means of the T-piece 10, the thermal flow-rate sensor 1 can be easily inserted in a pipeline and rapidly replaced if necessary.

FIG. 2 shows a cross-sectional view of the arrangement from FIG. 1, at the level of the line II—II. The direction of flow of the fluid flowing through the pipeline is indicated in FIG. 2 by the arrow S. Indicated in cross section are the flow sensor 3 and the thermal-conductivity measuring cell 4, as well as the above-mentioned temperature sensor, which is denoted in FIG. 2 by the reference 18. The temperature sensor 18 has outer dimensions which are similar to those of the flow sensor 3 and, like the flow sensor 3 and the thermal-conductivity measuring cell 4, it projects into the flowing fluid. FIG. 2 also shows the wall 19 of the T-piece 10.

In respect of the position of the flow sensor 3 and the thermal-conductivity measuring cell 4, the sectional plane in FIG. 1 is not precisely defined. By contrast, FIG. 2 shows accurately the arrangement of the flow sensor 3, the thermal-conductivity measuring cell 4 and the temperature sensor 18 in the support 2 and, by means of the line A—A, illustrates the sectional planes of the longitudinal section representation in FIG. 3. The thermal flow-rate sensor 1 is described in detail below with particular reference to FIGS. 3 and 4.

As shown by FIG. 3, the support 2 is shaped so that it supplements the interior of the wall of the T-piece 10 without creating disturbing projections or recesses which could result in unwanted turbulence in the flow of the fluid. The support 2 has a base 20 which merges upwardly into a cylindrical extension piece 22, from which originate several radial projections 23. The projections 23 are matched to corresponding grooves in the T-piece 10 and provide for a well-defined seating of the base 20 in the azimuthal direction. The upper end region of the cylindrical extension piece 22 is provided with an external screw thread 24 with which a matched internal screw thread of the tubular extension 5 can engage.

Running through the base 20 is a three-stage bore 25, with a lower region 26, a central region 27 and an upper region 28. The lower region 26 has a larger diameter than the central region 27 and the upper region 28 has a smaller diameter. The flow sensor 3 is inserted in the three-stage bore 25. A similar three-stage bore 29 carries the thermal-conductivity measuring cell 4 and is matched to its dimensions. Finally, the support 2 comprises a further bore, for the temperature sensor 18.

The flow sensor 3 has a casing in the form of a capsule 30 which, in the embodiment example, consists of a thin-walled metal tube with a closed, conically shaped end region. As shown by FIG. 4, in the interior of the capsule 30 there is a first heating device 32 and a first temperature detector 34 which are in close thermal contact with one another and with the wall of the capsule 30 via a filling compound 36. Supply leads 38 pass through the other end of the capsule 30, which is open, to the first heating device 32 and the first temperature detector 34 inside the capsule 30. In the embodiment example, the heating device 32 is a PTC resistor, i.e., a heating resistor whose resistance value in the operating range increases with the temperature. The first temperature detector 34 is a platinum measuring resistor in the embodiment example.

As shown by FIG. 3, a direct thermal contact between the base 20 and the capsule 30 exists only in the central region 27 of the three-stage bore 25, whereas, when the thermal flow-rate sensor 1 is in operation, the space created by the lower region 26 of the three-stage bore 25 enables a temperature to occur at the first heating device 32 which is independent of the temperature of the support 2, i.e., independent of the ambient temperature.

The thermal conductivity measuring cell 4 comprises a capsule 40 which is constructed like the capsule 30 and carries in its interior a second heating device and a second temperature detector which are in thermal contact with the lower region of the wall of the capsule 40 via a filling compound, in a manner similar to the flow sensor 3. The corresponding supply leads are also routed in a similar manner. The capsule 40 is surrounded by a measuring-cell casing 42, of a basic cylindrical shape, as depicted in FIG. 3. The measuring-cell casing 42 has an end 44 in which, as an opening, a sintered body 46 is inserted. When the thermal-conductivity measuring cell 4 is mounted, as shown in FIG. 3, the measuring-cell casing 42 creates a closed wall which surrounds the capsule 40 at a distance from it and thus creates an interior space which is accessible only via the sintered body 46 and a further small opening 48 on the circumferential surface of the measuring-cell casing 42. A fluid can enter the said interior space through the sintered body 46. This occurs essentially by diffusion, since the sintered body has such a small pore size that virtually no macroscopic flows occur. Consequently, when the thermal-conductivity measuring cell 4 is in operation, a heat transfer occurs between the capsule 40 and the measuring-cell casing 42, which is virtually at ambient temperature, essentially through thermal conduction only, for which reason the thermal-conductivity measuring cell 4 renders possible measurement of the thermal conductivity of the fluid. When fluid flows through the T-piece 10 along the outside of the further opening 48, there is produced in the interior of the measuring-cell casing 42 a slight negative pressure which causes fresh fluid to be continuously fed through the sintered body 46. It is therefore ensured that the composition of the fluid within the measuring-cell casing 42 corresponds with that of the fluid flowing in the T-piece 10.

The temperature sensor 18 also has a capsule, constructed like the capsule 30. In its interior there is only a temperature detector, which is in thermal contact with the capsule via a filling compound, but no heating device.

As mentioned above, the supply leads to the flow sensor 3, the thermal-conductivity measuring cell 4 and the temperature sensor 18 are all connected to the control and evaluation device. The control and evaluation device regulates the heating output of the first heating device 32, the temperature of which is detected by the first temperature detector 34, the heating power of the second heating device, the temperature of which is measured by the second temperature detector (capsule 40), operates these temperature detectors and the temperature sensor 18 and, in the embodiment example, performs a fully automatic measuring sequence, the result of which, namely the flow rate of the fluid through the T-piece 10, can be read off on the control and evaluation device. The manner in which the flow sensor 3, the thermal-conductivity measuring cell 4 and the temperature sensor 18 are operated as such is known to specialists in the art. For what follows, it is therefore sufficient to present the essential points and the significance of the thermal conductivity measurement in the sequence.

In the embodiment example, the heating power of the first heating device 32 (capsule 30) and of the second heating device (capsule 40) is regulated so that the respective heating device has a temperature which exceeds the ambient temperature detected by the temperature sensor 18 by 50 K. The heating power required for this is measured continuously.

Fluid flowing through the T-piece 10 removes from the flow sensor 3 heat which must be continuously re-supplied by the first heating device 32 in order to constantly maintain the temperature measured by the first temperature detector 34 at 50 K above the ambient temperature. The greater the flow rate, the more heat that is removed. The heating power of the first heating device 32 is thus a measure of the flow rate that is to be determined. Since, however, the heat dissipation capacity of the fluid is also dependent on its composition, information on the latter is required.

The necessary information is obtained by means of the thermal-conductivity measuring cell 4. This is because the composition of the fluid can be determined empirically from the thermal conductivity. The manner in which the thermal-conductivity measuring cell 4 is operated has already been explained. Further values necessary for evaluation of the measurement results and, consequently, for determining the flow rate can be obtained through separate calibration measurements and used as parameters by the control and evaluation device.

In terms of graphical representation, the control and evaluation device uses a set of curves which indicates the heating power of the first heating device 32 as a function of the flow rate that is to be determined. Of this set of curves, which curve is to be used at a given point in time depends on the composition of the fluid at that point in time, i.e., on its thermal conductivity or the measured value representing it, namely, that of the heating power supplied to the second heating device. In reaction to this heating power, therefore, the control and evaluation device can generate a measuring signal by which the appropriate curve is selected from the set of curves for the purpose of determining and, if appropriate, displaying the flow rate.

What is claimed is:

1. A thermal flow-rate sensor, comprising:
   a flow sensor having a first heating device and a first temperature detector reacting to the temperature of the first heating device, said flow sensor being exposed to a flowing fluid whose flow rate is to be determined, and
   a thermal-conductivity measuring cell having a measuring-cell casing, a second heating device and a second temperature detector reacting to the temperature of the second heating device, the measuring-cell casing having at least one opening arranged for entry of the fluid into the measuring-cell casing; and
   a control and evaluation device electrically connected to said thermal-conductivity measuring cell and said flow sensor for generating a first measuring signal, which characterizes a heat dissipation capacity of the fluid by heating power supplied to the second heating device and the temperature of the second temperature detector, and for generating a second measuring signal, which characterizes flow rate of the fluid by heating power supplied to the first heating device, the temperature of the first temperature detector, and the first measuring signal.

2. A thermal flow-rate sensor according to claim 1, wherein the first measuring signal is assigned to the composition of the fluid.

3. A thermal flow-rate sensor according to claim 1, wherein the control and evaluation device is arranged for determining the flow rate of the fluid by means of parameters determined in calibration measurements, and the second measuring signal.

4. A thermal flow-rate sensor according to claim 1, including a third temperature detector for measuring ambient temperature.

5. A thermal flow-rate sensor according to claim 1, wherein said control and evaluation device is arranged for regulating the heating power of the first heating device so that the temperature of the first temperature detector exceeds ambient temperature by a predefined value.

6. A thermal flow-rate sensor according to claim 1, wherein said control and evaluation device is arranged for regulating the heating power of the second heating device so that the temperature of the second temperature detector exceeds ambient temperature by a predefined value.

7. A thermal flow-rate sensor according to claim 1, wherein said measuring-cell casing includes a porous sintered body permeable to the flowing fluid.

8. A thermal flow-rate sensor according to claim 7, wherein the measuring-cell casing comprises a further opening spaced from the sintered body.

9. A thermal flow-rate sensor according to claim 8, wherein the measuring-cell casing has a cylindrical body, the sintered body being disposed at an end of said measuring-cell casing, said further opening being disposed on the circumferential surface of the cylindrical body, both the second heating device and the second temperature detector being disposed in a region around the longitudinal axis of the cylindrical body.

10. A thermal flow-rate sensor according to claim 1, wherein the first heating device and the first temperature detector are disposed in thermal contact in a first capsule and the second heating device and the second temperature detector being disposed in thermal contact in a second capsule.

11. A thermal flow-rate sensor according to claim 1, wherein the thermal-conductivity measuring cell is disposed in the flow shadow of the flow sensor.

12. A thermal flow-rate sensor according to claim 1, wherein the first heating device comprises a PTC heating resistor having a positive temperature coefficient and the second heating device comprises a PTC heating resistor having a positive temperature coefficient.

13. A thermal flow-rate sensor according to claim 1, wherein the flow sensor and the thermal-conductivity measuring cell are mounted on a common support adapted for connection with a T-piece provided on a pipeline for the flowing fluid.

14. A method for determining the flow rate of a fluid comprising the steps of:
   flowing the fluid past a flow sensor having a first heating device and a first temperature detector;
   providing heating power to said first heating device;
   detecting the temperature of the first heating device by means of the first temperature detector;
   flowing a portion of the fluid into a thermal-conductivity measuring cell having a measuring-cell casing, a second heating device and a second temperature detector;
   providing heating power to said second heating device;
   detecting the temperature of the second heating device;
   flowing a portion of the fluid into at least one opening in the measuring-cell casing for flow of said fluid portion into the measuring-cell casing, and
   providing a first measuring signal characterizing the heat dissipation capacity of the fluid as a function of said heating power supplied to the second heating device and the temperature of the second temperature detector; and
   providing a second measuring signal, characterizing the flow rate of the fluid as a function of said heating power supplied to the first heating device, the temperature of the first temperature detector and the first measuring signal.

15. A method according to claim 14 including providing a third temperature detector for measuring ambient temperature.

16. A method according to claim 15 including regulating the heating power of the first heating device so that the temperature of the first temperature detector exceeds the ambient temperature by a predefined value.

17. A method according to claim 15 including regulating the heating power of the second heating device so that the temperature of the second temperature detector exceeds the ambient temperature by a predefined value.

18. A method according to claim 14 including assigning the first measuring signal to the composition of the fluid.

19. A method according to claim 14 including determining the flow rate of the fluid from the second measuring signal and parameters determined in calibration measurements.

20. A method according to claim 14 including providing a porous sintered body permeable to the fluid in the measuring-cell casing, providing a further opening in the measuring-cell casing spaced from the sintered body and flowing the fluid past the further opening outside the measuring-cell casing to produce within the measuring-cell casing a negative pressure which draws fluid into the measuring-cell casing through the sintered body.

21. A method according to claim 14 including determining the flow rate of the fluid comprised of a mixture of air and hydrocarbons with up to four carbon atoms.

\* \* \* \* \*